US012665978B2

(12) United States Patent
Heo et al.

(10) Patent No.: US 12,665,978 B2
(45) Date of Patent: Jun. 23, 2026

(54) METHOD AND APPARATUS WITH PREVIEW IMAGE GENERATION

(71) Applicant: SAMSUNG ELECTRONICS CO., LTD., Suwon-si (KR)

(72) Inventors: Jingu Heo, Suwon-si (KR); Yunhao Zhang, Xi'an (CN); Yue Ma, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 18/188,811

(22) Filed: Mar. 23, 2023

(65) Prior Publication Data

US 2023/0308599 A1 Sep. 28, 2023

(30) Foreign Application Priority Data

Mar. 23, 2022 (CN) .......................... 202210294062.2
Jan. 26, 2023 (KR) ........................ 10-2023-0009993

(51) Int. Cl.
    *H04N 5/262* (2006.01)
    *G06T 7/00* (2017.01)
    (Continued)

(52) U.S. Cl.
    CPC ............. *H04N 5/2624* (2013.01); *G06T 7/97* (2017.01); *H04N 5/2224* (2013.01);
    (Continued)

(58) Field of Classification Search
    CPC .. H04N 5/2624; H04N 5/2224; H04N 5/2628; H04N 5/265; G06T 7/97; G06T 2207/20221
    (Continued)

(56) References Cited

U.S. PATENT DOCUMENTS 7,606,441 B2 10/2009 Ouchi
7,619,626 B2 11/2009 Bernier
(Continued)

FOREIGN PATENT DOCUMENTS

CN 103959279 B 3/2017
CN 106484693 B 9/2019
(Continued)

OTHER PUBLICATIONS

Baudisch et al. "Panoramic viewfinder: providing a real-time preview to help users avoid flaws in panoramic pictures" *Proceedings of the 17th Australia conference on Computer-Human Interaction: Citizens Online: Considerations for Today and the Future.* 2005 (pp. 1-10).
(Continued)

*Primary Examiner* — Stephen P Coleman
(74) *Attorney, Agent, or Firm* — NSIP Law

(57) ABSTRACT

A processor-implemented method includes: determining whether a plurality of tile sets of different zoom levels comprises a tile image, based on either one or both of a position of the tile image in a virtual image and a size of the tile image, wherein tile image corresponds to a visible region covered by a preview interface in the virtual image; updating the tile image based on whether the plurality of tile sets comprises the tile image; and generating a preview image corresponding to the tile image by stitching the updated tile image.

19 Claims, 10 Drawing Sheets

(51) Int. Cl.
H04N 5/222 (2006.01)
H04N 5/265 (2006.01)

(52) U.S. Cl.
CPC ........... H04N 5/2628 (2013.01); H04N 5/265
(2013.01); G06T 2207/20221 (2013.01)

(58) Field of Classification Search
USPC .......................................................... 382/100
See application file for complete search history.

(56) References Cited

U.S. PATENT DOCUMENTS

| | | | |
|---|---|---|---|
| 10,839,508 | B2 | 11/2020 | Zhang et al. |
| 2006/0268130 | A1 | 11/2006 | Williams et al. |
| 2007/0025723 | A1 | 2/2007 | Baudisch et al. |
| 2009/0278806 | A1* | 11/2009 | Duarte ................ G06F 3/03547 |
| | | | 345/173 |

| | | | |
|---|---|---|---|
| 2010/0150472 | A1 | 6/2010 | Chen |
| 2010/0201707 | A1* | 8/2010 | Rasmussen ............... G06T 3/40 |
| | | | 345/620 |

FOREIGN PATENT DOCUMENTS

| | | |
|---|---|---|
| JP | 2019-211963 A | 12/2019 |
| WO | WO 2008/089069 A1 | 7/2008 |

OTHER PUBLICATIONS

Zhu et al. "A Comparative Study of Blending Algorithms for Realtime Panoramic Video Stitching" *CoRR*. May 2016 (pp. 1-15).
Zhao et al. "Multi-band blending of aerial images using GPU acceleration" *2017 10th International Congress on Image and Signal Processing, BioMedical Engineering and Informatics (CISP-BMEI)*. IEEE, 2017 (pp. 1-5).

* cited by examiner

METHOD AND APPARATUS WITH PREVIEW IMAGE GENERATION

CROSS-REFERENCE TO RELATED APPLICATIONS

This application claims the benefit under 35 USC § 119(a) of Chinese Patent Application No. 202210294062.2, filed on Mar. 23, 2022 in the China National Intellectual Property Administration, and Korean Patent Application No. 10-2023-0009993, filed on Jan. 26, 2023 in the Korean Intellectual Property Office, the entire disclosures of which are incorporated herein by reference for all purposes.

BACKGROUND

1. Field

The following description relates to a method and apparatus with preview image generation.

2. Description of Related Art

Image stitching may be stitching a plurality of images to one image. The image stitching may be used for, for example, aerial photography by a drone and panoramic photography by a mobile phone. A preview service that previews a result image to be generated through image stitching may guide a user to capture an important part without missing it.

The overall computational load of image stitching technology may be large. For example, an image fusion algorithm used to stitch a high-resolution image may consume a large amount of computing resources. A downsampled low-resolution stitched image may be typically generated to ensure the speed of previewing a stitched image. However, the low-resolution stitched image may not display image details. Even when using an acceleration technique of a graphics processing unit (GPU) (such as an open computing language (OpenCL) or a unified computing device architecture (CUDA)) to generate a high-resolution stitched image by using the fusion algorithm, a long time and a large amount of resources may still be consumed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: determining identification information of a tile image corresponding to a visible region covered by a preview interface in a virtual image corresponding to an original image displayed on a screen of a user terminal; determining image information of the tile image based on the identification information of the tile image; and generating a preview image corresponding to the tile image by stitching the image information of the tile image.

The determining the identification information of the tile image may include determining the identification information of the tile image, based on a zoom level received through the preview interface and a plurality of tile sets determined by downsampling the virtual image to different zoom levels.

The tile sets may include identification information of tile images may included in virtual images comprising different zoom levels through a pyramid structure, and layers of the pyramid structure may respectively correspond to the tile sets comprising the different zoom levels.

The received zoom level may be determined by a user gesture that is recognized through the preview interface on the screen of the user terminal.

The user gesture may include any one or any combination of any two or more of zoom-in and zoom-out operations performed using two fingers of a user, zoom-in and zoom-out operations performed through a double click of the user, and a dragging operation performed by the user.

The identification information of the tile image may include any one or any combination of any two or more of a position of the tile image in the virtual image, a size of the tile image, and a flag indicating whether a plurality of tile sets may include the tile image.

The determining the image information of the tile image may include: determining whether a plurality of tile sets may include the tile image, based on the identification information of the tile image; determining the image information of the tile image from the tile sets in response to determining that the tile sets may include the tile image; and updating the tile image in response to determining that the tile sets do not may include the tile image.

The updating the tile image may include: updating the tile image corresponding to the visible region in response to determining that the tile sets do not may include an entirety of the tile image; and updating a tile image corresponding to a peripheral region of the visible region in response to determining that the tile sets may include the entirety of the tile image.

The updating the tile image corresponding to the visible region may include: determining target identification information of the tile image may included in a target tile set covered by the visible region of the tile sets; determining partial images for stitching in the original image by performing reverse mapping on the original image, based on the target identification information; and partially updating the tile image corresponding to the visible region by partially stitching the partial images to a portion of the tile image.

The updating the tile image corresponding to the visible region may include: determining whether a database may include the tile image that is not may included in the tile sets; extracting the tile image that is not may included in the tile sets from the database in response to determining that the database may include the tile image that is not may included in the tile sets; and storing the extracted tile image in a target tile set corresponding to the visible region.

The updating the tile image corresponding to the visible region may include: determining whether the identification information of the tile image changes according to movement of the visible region; and updating a tile image corresponding to a new region covered by the moved visible region in the tile sets corresponding to different zoom levels in response to determining that the identification information of the tile image changes.

The updating the tile image corresponding to the new region may include: determining whether a portion of a tile image covered by the preview interface in the moved visible region changes; and removing a tile image that is not covered by the preview interface from a target tile set corresponding to a zoom level received by a user in response to determining that the portion of the tile image covered by the preview interface changes.

The method may include determining the virtual image as the same size as the size of the original image, based on a preset stitching setting.

The method may include determining a plurality of tile sets corresponding to different zoom levels by sampling the virtual image to the different zoom levels.

The method may include displaying the preview image on the preview interface.

The method may include either one or both of: caching the tile image in a target tile set corresponding to a zoom level received through the preview interface among the tile sets; and storing the target tile set in which the tile image is cached in a database.

The method may include: determining whether the identification information of the tile image changes according to movement of the visible region; and deleting a tile image corresponding to the changed identification information from a target tile set corresponding to the visible region in response to a change of the identification information of the tile image.

In one or more general aspects, a non-transitory computer-readable storage medium stores instructions that, when executed by a processor, configure the processor to perform any one, any combination, or all of operations and/or methods described herein.

In one or more general aspects, an apparatus includes: one or more processors configured to: determine identification information of a tile image corresponding to a visible region covered by a preview interface in a virtual image corresponding to an original image displayed on a screen of a user terminal; determine image information of the tile image based on the identification information of the tile image; and generate a preview image corresponding to the tile image by stitching the image information of the tile image.

The apparatus may include a display device configured to display the preview image through the preview interface.

The one or more processors may be configured to: determine the virtual image as the same size as the size of the original image, based on a preset stitching setting; and determine a plurality of tile sets corresponding to different zoom levels by sampling the virtual image to the different zoom levels.

In one or more general aspects, a processor-implemented method includes: determining whether a plurality of tile sets of different zoom levels may include a tile image, based on either one or both of a position of the tile image in a virtual image and a size of the tile image, wherein tile image corresponds to a visible region covered by a preview interface in the virtual image; updating the tile image based on whether the plurality of tile sets may include the tile image; and generating a preview image corresponding to the tile image by stitching the updated tile image.

Other features and aspects will be apparent from the following detailed description, the drawings, and the claims.

Figure 1:
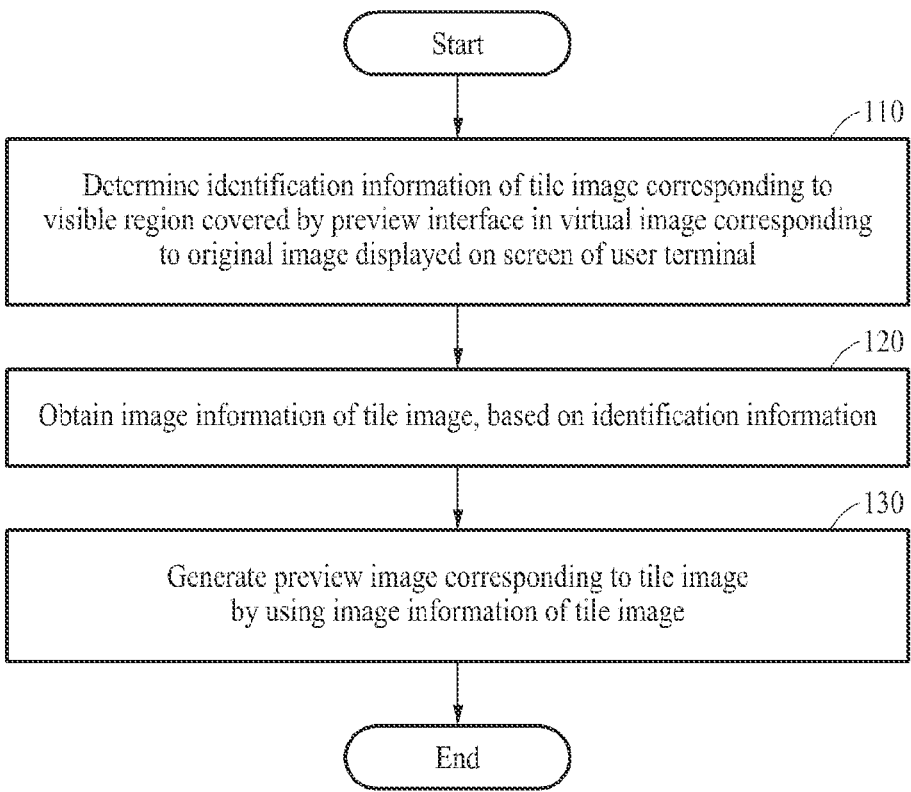
FIG. 1 illustrates an example of a method of generating a preview image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meaning as commonly understood by one of ordinary skill in the art to which examples belong, specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, the examples are described in detail with reference to the accompanying drawings. When describing the examples with reference to the accompanying drawings, like reference numerals refer to like elements and a repeated description related thereto will be omitted.

FIG. 1 illustrates an example of a method of generating a preview image. Operations 110 to 130 to be described hereinafter may be performed sequentially but not necessarily performed sequentially. For example, the order of the operations 110 to 130 may change and at least two of the operations may be performed in parallel or simultaneously. Further, one or more of operations 110 to 130 may be omitted, without departing from the spirit and scope of the shown example.

Referring to FIG. 1, a device for generating a preview image (hereinafter, the "generation device," e.g., a genera-

Figure 10:
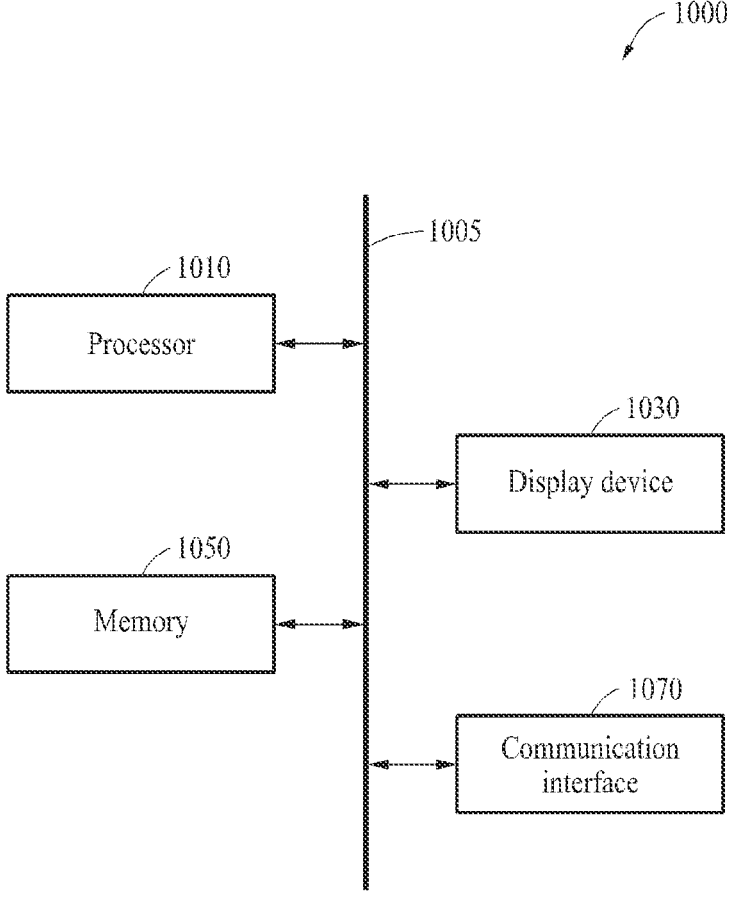
FIG. 10 illustrates an example of a device for generating a preview image.

6 tion device 1000 of FIG. 10) may generate a preview image through operations 110 to 130.

In operation 110, the generation device may determine identification information of a tile image corresponding to a visible region covered by a preview interface in a virtual image corresponding to an original image displayed on a screen of a user terminal. The preview interface may be a visual interface displayed on the screen of the user terminal. Examples of the preview interface may be preview interfaces 210, 213, and 215 of FIG. 2, but examples are not limited thereto. In an example, the 'visible region' covered by the preview interface may be a region in which a user may view a stitched image through the preview interface. The visible region may be also referred to as a 'preview region' since the visible region is a region viewed through the preview interface.

The 'virtual image' may be an image of which a size is the same as the size of the original image or the size of a whole stitched image. The virtual image may be determined based on preset stitching settings. The stitching settings may include, for example, which original image is used in a stitching process, how the original image is arranged, or the like, but examples are not limited thereto.

The 'tile image' may be an image portion of the virtual image. The tile image may be an image portion corresponding to a region (e.g., the visible region) covered by the preview interface of the virtual image. The tile image may be a square grid image segmented by rows and columns according to a zoom level or a magnification. There may be one or more tile images. Hereinafter, the one or more tile images may be expressed as a singular form for ease of description, but the singular form does not exclude embodiments including a plurality of tile images. The tile image may be simply referred to as a 'tile'. In addition, the 'tile image corresponding to the visible region' may be simply referred to as the 'tile image of the visible region' for ease of description.

The identification information of the tile image may include, for example, at least one of a position of the tile image in the virtual image or the whole (e.g., an entirety of the) stitched image, the size of the tile image, and a flag indicating whether a plurality of tile sets includes the tile image, but examples are not limited thereto. The identification information of the tile image may be simply referred to as the 'identification information'.

In operation 110, the generation device may determine the identification information of the tile image, based on a zoom level received through the preview interface and a plurality of tile sets obtained (e.g., determined) by downsampling the virtual image to different zoom levels. In an example, the zoom level received through the preview interface may be a zoom size of the whole stitched image that the user desires to view. The zoom level received through the preview interface may be determined by the user's gesture that is recognized through the preview interface on the screen of the user terminal. The user's gesture may include, for example, at least one of zoom-in and zoom-out operations by using two fingers of the user, zoom-in and zoom-out operations through a double click of the user, and a dragging operation of the user, but examples are not limited thereto. Examples of the original image, the virtual image, the tile image, the tile sets, and a pyramid structure of the tile sets are described in detail below with reference to FIG. 2.

In operation 120, the generation device may obtain (e.g., determine) image information of the tile image based on the identification information of the tile image that is determined in operation 110.

The generation device may determine whether the tile sets include the tile image, based on the identification information of the tile image.

The generation device may obtain the image information from the tile sets when it is determined that the tile sets include the tile image.

The generation device may update a tile image corresponding to a peripheral region of the visible region when it is determined that the tile sets include the whole (e.g., an entirety) of the tile image. The generation device may update a tile image corresponding to a peripheral region of the remaining region excluding the visible region when the tile sets include the whole of the tile image.

The generation device may update the tile image corresponding to the visible region when it is determined that the tile sets do not include the whole of the tile image.

The generation device may determine target identification information of the tile image included in a tile set (or 'target tile set') covered by the visible region of the tile sets. In an example, the 'target tile set covered by the visible region' may be a tile set including the tile image corresponding to the visible region. The generation device may determine partial images used for stitching in the original image by performing reverse mapping on the original image, based on the target identification information. The partial images may be an image portion of the original image. The partial images may be at least two image portions of the original image used for image stitching to obtain a stitched image. Image information of the partial images may include position information of the partial images, an image pixel of the partial images, and/or red, green, and blue (RGB) information thereof, but examples are not limited thereto. The image information of the partial images may be information on partial images used for stitching to obtain the tile image corresponding to the visible region of the original image. The generation device may partially update the tile image corresponding to the visible region by partially stitching the partial images to a portion of the tile image.

The generation device may store all tile images obtained through stitching in a database. Then, the generation device of one or more embodiments, by extracting a tile image to be used for generating the preview image directly from the database, may quickly and easily call the preview interface and display the preview image. Accordingly, the generation device of one or more embodiments may reduce a time consumed for a stitching operation by directly extracting a tile image from the database and may improve the speed of providing the preview image.

In addition, when it is determined that the tile sets do not include the whole of the tile image, the generation device may update a tile set corresponding to the visible region, based on whether the database includes a tile image that is not included in the tile sets. For example, the generation device may determine whether the database includes the tile image that is not included in the tile sets. The generation device may extract the tile image that is not included in the tile sets from the database when it is determined that the database includes the tile image that is not included in the tile sets. The generation device may store the tile image extracted from the database in a target tile set corresponding to the visible region.

According to embodiments, the visible region may be moved by a change of the user's gesture recognized through the preview interface, and the tile sets may not include the whole of the tile image. When the visible region is moved and the tile sets do not include the whole of the tile image, the generation device may check whether the visible region is moved and update a tile image corresponding to a new region that is covered by the moved visible region.

For example, the generation device may determine whether the identification information of the tile image changes according to the movement of the visible region. The generation device may update the tile image corresponding to the new region that is covered by the moved visible region in the tile sets corresponding to different zoom levels when it is determined that the identification information of the tile image changes. The generation device may determine, for example, whether a moving distance of the moved visible region is within a threshold distance (e.g., a cache region) and/or whether a portion of the tile image that is covered by the preview interface changes in the moved visible region. The generation device may remove a tile image that is not covered by the preview interface from a target tile set corresponding to a zoom level received by the user when it is determined that the portion of the tile image covered by the preview interface changes.

An example of the method of obtaining the image information of the tile image is described in detail below with reference to FIGS. 3 to 6.

In operation 130, the generation device may stitch the image information of the tile image obtained in operation 120 and generate a preview image corresponding to the tile image. The preview image may correspond to one tile image or a plurality of tile images. In an example, the preview image corresponding to the tile image may be, for example, an image stitched by using the image information of the tile image obtained in operation 120.

For example, the generation device may select partial images, which are to be used for stitching, from the original image through operation 120 and stitch the selected partial images to the tile image (e.g., an image of a portion including a preview interface of the virtual image) in operation 130.

When a portion of the tile image is included in the tile sets, but the other portion of the tile image is not included in the tile sets, the generation device may partially update the tile image corresponding to the other portion of the tile image through stitching and improve the speed of providing the preview image. To this end, the identification information of the tile image may include a flag indicating whether the tile sets include the tile image. For example, when a tile image x is included in a first tile set among the first tile set, a second tile set, and a third tile set, a flag corresponding to the first tile set in identification information of the tile image x may be set to '1', and flags respectively corresponding to the second tile set and the third tile set may be set to '0'.

Accordingly, the generation device, by using the flag included in the identification information of the tile image, may determine that the portion of the tile image is included in the tile sets, and the other portion of the tile image is not included by the tile sets. The generation device may obtain the tile image that is not included in the tile sets through image stitching and may not stitch the tile image that is already included in the tile sets again.

The generation device may display the preview image generated in operation 130 through the preview interface. The generation device may display the preview image corresponding to the tile image through the preview interface and cache the tile image displayed as the preview image in the target tile set corresponding to the received zoom level among the tile sets. The generation device may cache the stitched tile image in the target tile set to rapidly call the tile image.

In addition, the generation device may store the stitched tile image in the database. The generation device of one or more embodiments may cache the tile image corresponding to the preview image in the target tile set, and then, rapidly call the tile image cached in the target tile set and store the tile image in the database. When the tile image cached in the target tile set is lost, the generation device of one or more embodiments may call the tile image (the stitched tile image) stored in the database and prevent the same tile image from being stitched again, thereby improving the speed of providing the preview image.

The tile sets may be stored in a system memory (e.g., a memory of a central processing unit (CPU)), but, e.g., when the generation device is a mobile platform or is implemented with the mobile platform, a system memory of the mobile platform may have a limited size and a small cache space. Accordingly, the generation device may store all tile images in the database. For example, when a previous tile image stored in the tile sets is lost or deleted with a new tile image added to the tile sets, the generation device of one or more embodiments may call the previous tile image through the database and prevent the performing of image stitching again to provide a preview image corresponding to the previous tile image, thereby improving the speed of providing the preview image.

For example, after the tile image is displayed as the preview image through the preview interface, the visible region covered by the preview interface may be moved, and the identification information of the tile image corresponding to the visible region may change. The generation device may determine whether the identification information of the tile image changes according to the movement of the visible region. In response to the change of the identification information of the tile image, the generation device may delete the tile image corresponding to the changed identification information from the target tile set corresponding to the visible region.

The generation device may store the tile image corresponding to the visible region covered by the preview interface and data related to the tile image all in a tile set, and in case of a tile image (a tile image in a region adjacent to the visible region) corresponding to a region not covered by the preview interface, store only identification information of the tile image in the tile set. For example, when a tile image B is stitched but not covered by the preview interface, the generation device of one or more embodiments may prevent an increase of memory usage due to an increase of tile images included in the tile sets by storing only the tile image B and the data related to the tile image B in the database and deleting the rest of data, excluding identification information of the tile image B, from the tile sets.

When the identification information of the tile image included in the visible region covered by the preview interface changes, the generation device may obtain and display a new tile image corresponding to a visible region newly covered by the preview interface, and at the same time, update the new tile image in the tile sets and/or the database.

In an example, a moving distance of the preview interface by the user on a display screen may not be great, and the tile image corresponding to the visible region covered by the preview interface may not change as a whole. In other words, a portion of the tile image corresponding to the visible region covered by the preview interface may correspond to an original tile image and the other portion of the tile image may be a new tile image. In an example, the generation device may release the caching of the tile image corresponding to the region not covered by the preview interface from the tile sets and newly store the time image corresponding to the visible region newly covered by the preview interface in the tile sets. The generation device may add the tile image corresponding to the visible region newly covered according to the movement of the preview interface to the database and maintain a previously stored tile image without deleting it.

Accordingly, as described above, the generation device of one or more embodiments may provide a high-resolution preview image while ensuring a rapid preview speed by displaying a tile image corresponding to a result of stitching a portion of the tile image that is covered by the preview interface or the preview image corresponding to the tile image without waiting for a fully stitched image to be completely generated when previewing the stitched image.

Figure 2:
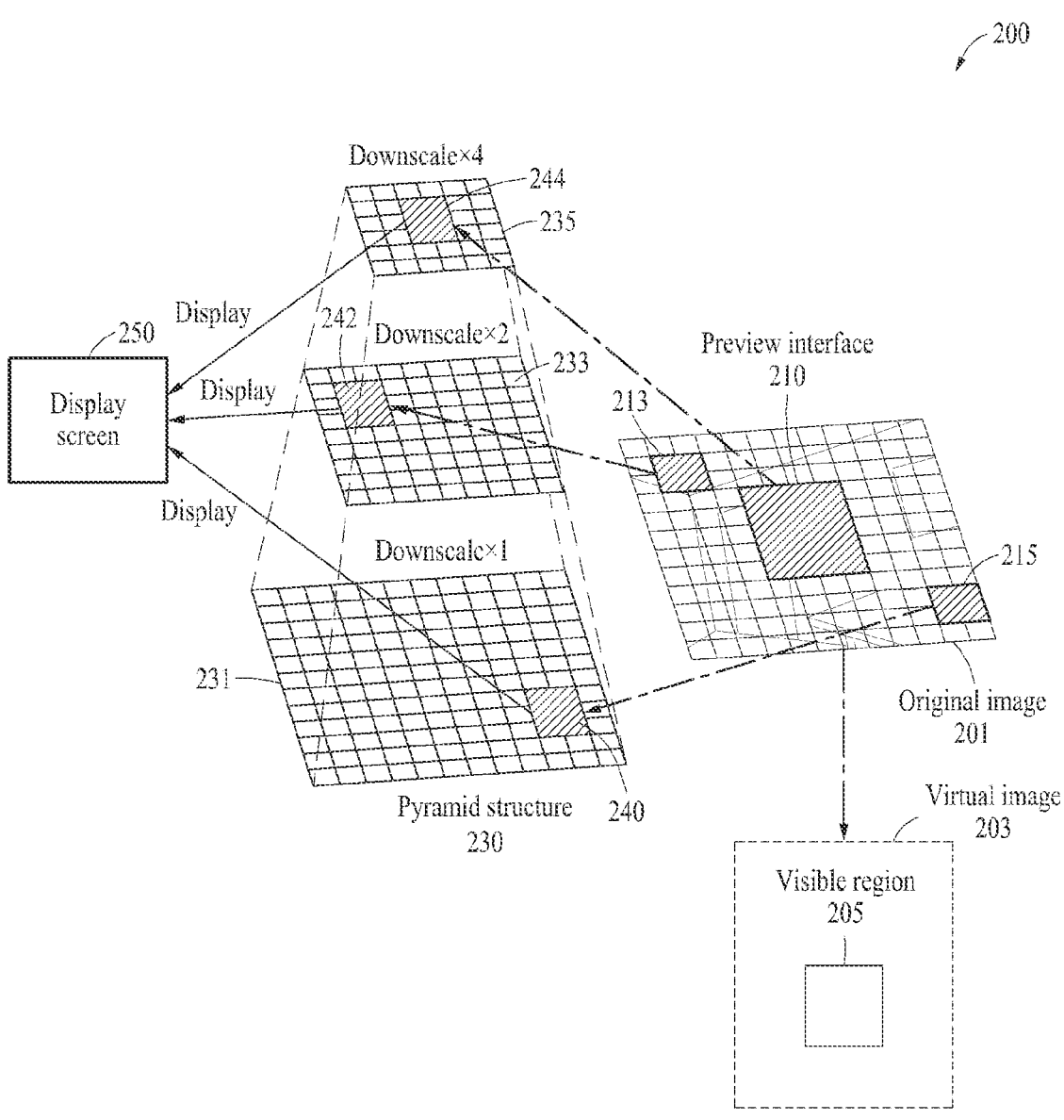
FIG. 2 illustrates an example of an original image, a virtual image, a tile image, a plurality of tile sets, and a pyramid structure of the tile sets.

FIG. 2 illustrates an example of an original image, a virtual image, a tile image, a plurality of tile sets, and a pyramid structure of the tile sets. Referring to FIG. 2, a diagram 200 illustrates a relationship among an original image 201, a virtual image 203 (e.g., virtual images 203 including different zoom levels), tile images 240, 242, and 244, tile sets 231, 233, and 235, and a tile pyramid structure 230 of the tile sets 231, 233, and 235.

The tile sets 231, 233, and 235 may respectively include respective pieces of identification information of the tile images 240, 242, and 244 corresponding to the virtual images 203 including different zoom levels.

The tile sets 231, 233, and 235 may be in the tile pyramid structure 230 as illustrated in FIG. 2. Hereinafter, for ease of description, the tile pyramid structure 230 is simply referred to as the 'pyramid structure 230'. Layers of the pyramid structure 230 may respectively correspond to tile sets of different zoom levels. For example, in the pyramid structure 230, a first layer at the bottom of the pyramid structure 230 may correspond to the tile set 231 downscaled once (that is, the tile set 231 not downsampled), a second layer on top of the first layer may correspond to the tile set 233 that is downscaled twice, and a third layer on top of the second layer may correspond to the tile set 235 that is downscaled four times. A tile set of each layer may store respective pieces of data (e.g., identification information of a tile image in a virtual image) of the tile images of different zoom levels.

The generation device may set the tile sets 231, 233, and 235 respectively including the pieces of identification information of the tile images 240, 242, and 244 corresponding to the virtual images 203 including different zoom levels such that a user may preview an image stitched at the different zoom levels.

In an example, a zoom level may correspond to a zoom size of a stitched image the user desires to view. For example, the zoom level may correspond to one-time downscaling (downsampling), two-time downscaling (downsampling), and/or four-time downscaling (downsampling), but examples are not limited thereto. The generation device may determine the zoom level by recognizing the user's gesture control (e.g., two-finger zoom-in/zoom-out, double-click zoom-in/zoom-out, sliding movement, etc.) through a terminal screen.

For example, the user may set preview interfaces 210, 213, and 215 to a certain size through the gesture control of two-finger zoom-out in the original image 201 displayed on a display screen 250. In an example, when the virtual image 203 corresponds to the original image 201, a region of the virtual image 203 corresponding to a region of the preview interface 210 set in the original image 201 may be referred to as a 'visible region 205'. The virtual image 203 may be the whole of a stitched image that is generated virtually.

The generation device may obtain the identification information of the tile image corresponding to the visible region 205 from the tile sets 231, 233, and 235. For example, when the user sets the visible region 205 to correspond to a region of the preview interface 210, the generation device may obtain the identification information of the tile image 244 corresponding to the visible region 205 corresponding to the region of the preview interface 210. Alternatively or additionally, when the user sets the visible region 205 to correspond to a region of the preview interface 213, not the region of the preview interface 210, the generation device may obtain the identification information of the tile image 242 corresponding to the visible region 205 corresponding to the region of the preview interface 213. Alternatively or additionally, when the user sets the visible region 205 to correspond to a region of the preview interface 215, the generation device may obtain the identification information of the tile image 240 corresponding to the visible region 205 corresponding to the region of the preview interface 215.

The generation device may obtain image information of the tile image 244, based on the identification information of the obtained tile image 244. In an example, the generation device may obtain the image information of the tile image 244 from the tile set 235 among the tile sets 231, 233, and 235 and/or obtain the image information of the tile image 244 from the database.

The generation device may generate a preview image corresponding to the tile image 244 by stitching the image information of the tile image 244 and display the preview image through the display screen 250.

According to an embodiment, the generation device of one or more embodiments may store a plurality of tile sets of different resolutions in the pyramid structure 230, and when the tile sets do not include a tile image, the generation device of one or more embodiments may determine partial images corresponding to a region to be stitched in the original image 201 and perform stitching such that the partial images may be rapidly stitched to a high resolution.

Figure 3:
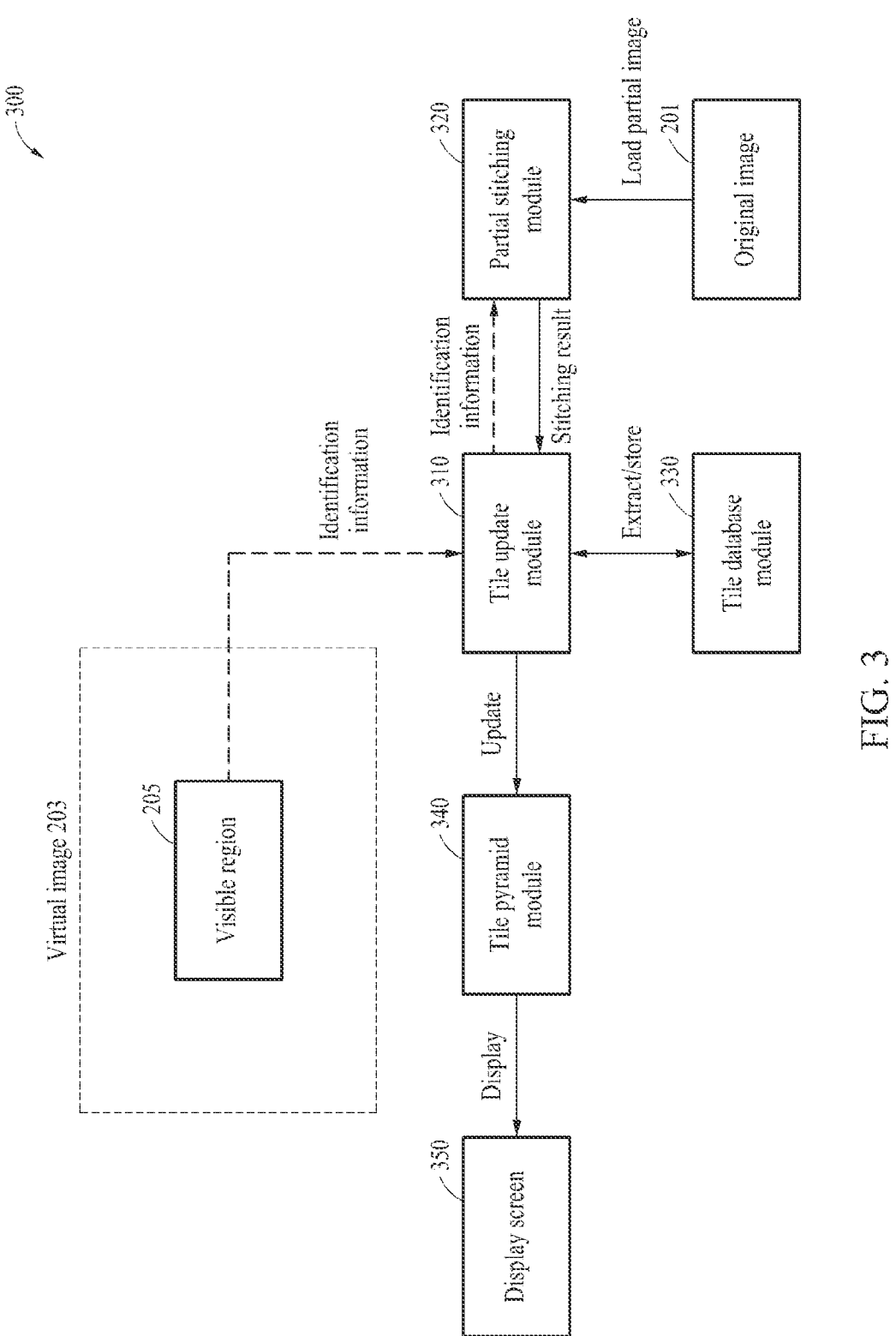
FIG. 3 illustrates an example of generating a preview image.

FIG. 3 illustrates an example of generating a preview image. Referring to FIG. 3, a generation device 300 may include a tile update module 310, a partial stitching module 320, a tile database module 330, and a tile pyramid module 340.

In the example of FIG. 3, the generation device 300 is illustrated as separately configured components to describe functions by distinguishing the functions from one another. Accordingly, when actually implementing a product, the generation device 300 may include all the components or process some or all of the components in one or more processors.

The tile update module 310 may update a plurality of tile sets. The tile update module 310 may verify whether a tile image corresponding to a visible region 205 is cached in the tile sets (e.g., where the tile sets are stored in a system memory of processor 1010 of FIG. 10), based on identification information of the tile image corresponding to the visible region 205 in a virtual image 203. Hereinafter, for ease of description, the tile image corresponding to the visible region 205 may be referred to as a 'target tile image'. When the tile update module 310 verifies that the target tile image is not cached in the tile sets, the tile update module 310 may extract a stitching result corresponding to the tile target image from the partial stitching module 320 or the tile database module 330. In an example, the stitching result corresponding to the target tile image may correspond to a stitched tile image.

The tile update module 310 may store the stitching result (the stitched image) corresponding to the target tile image in a tile set corresponding to the visible region 205 in the tile pyramid module 340 and update the tile image. An example of the operation of the tile update module 310 is described in detail below with reference to FIG. 4.

The partial stitching module 320 may obtain partial images related to the visible region 205 from an original image 201, based on the visible region 205 covered by a preview interface in the virtual image 203, and stitch the obtained partial images. An example of the operation of the partial stitching module 320 is described in detail below with reference to FIG. 6.

The tile database module 330 may store, in a file system (e.g., a database of a memory 1050 of FIG. 10), the stitching result (e.g., the stitched tile image) of the partial stitching module 320 received from the tile update module 310. An example of the operation of the tile database module 330 is described in detail below with reference to FIG. 7.

The tile pyramid module 340 may store, by layers, data (e.g., identification information of tile images in the virtual image 203) of the tile images downsampled to various zoom levels by using the tile sets in a pyramid structure (e.g., the pyramid structure 230 of FIG. 2). In an example, the respective layers included in the pyramid structure may correspond to the respective tile sets, that is, respective pieces of the data of the tile images corresponding to the respective zoom levels. An example of the operation of the tile pyramid module 340 is described in detail below with reference to FIG. 8.

Figure 4:
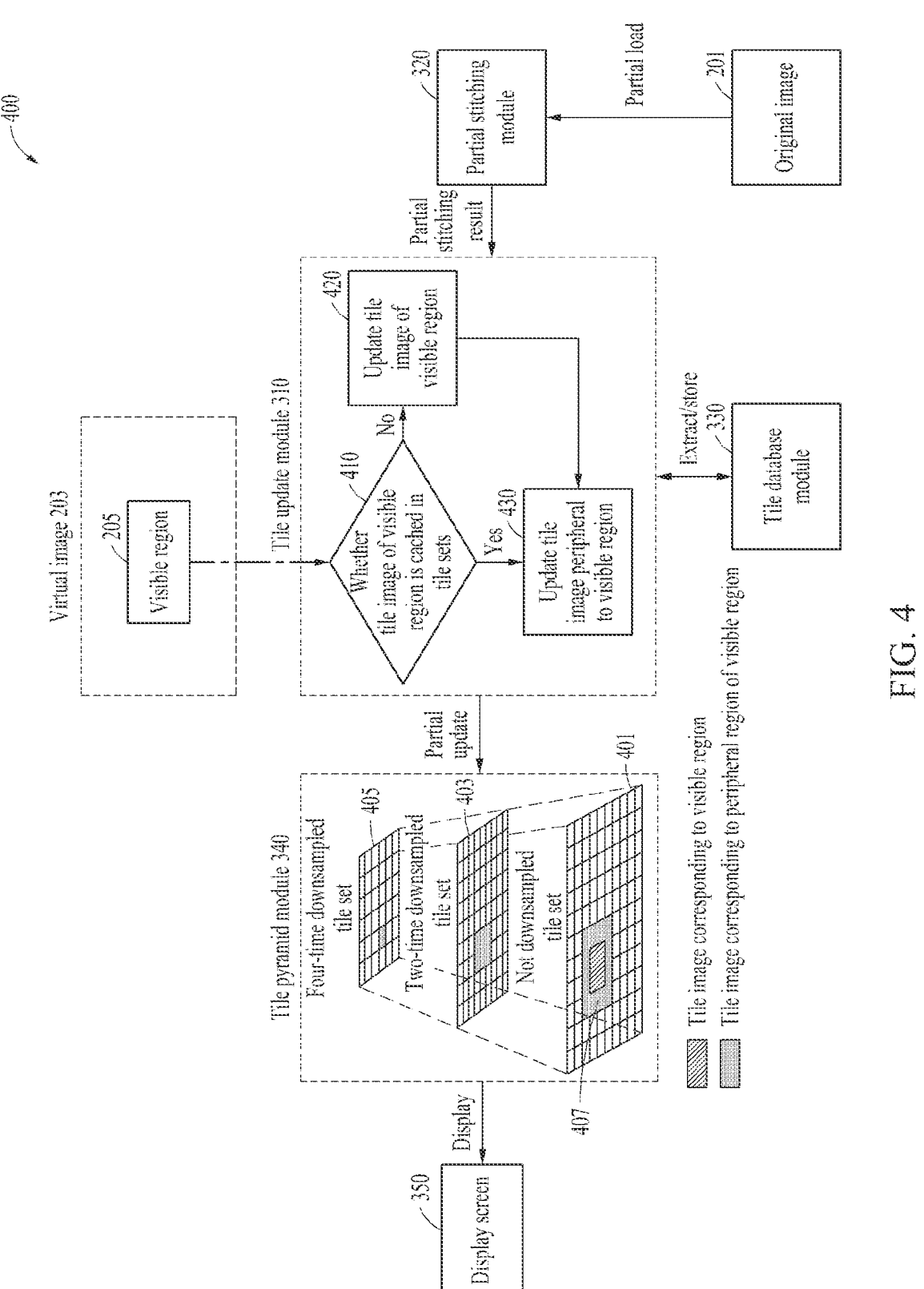
FIG. 4 illustrates an example of a method of updating a tile image.

FIG. 4 illustrates an example of a method of updating a tile image. Referring to FIG. 4, a diagram 400 illustrates a process of updating a tile image corresponding to a visible region 205 by a tile update module 310 of a generation device.

The generation device may obtain image information of the tile image from one of tile sets 401, 403, and 405 according to whether the tile image corresponding to the visible region 205 is included in the tile sets 401, 403, and 405 of a tile pyramid module 340. In an example, the tile set 401 may be a tile set downsampled once (that is, not downsampled), the tile set 403 may be a tile set downsampled twice, and the tile set 405 may be a tile set downsampled four times.

In operation 410, based on identification information of the tile image, the generation device may determine whether the tile image (e.g., a tile image 407) corresponding to the visible region 205 is included in the tile sets 401, 403, and 405, e.g., whether the tile image corresponding to the visible region 205 is cached in the tile sets 401, 403, and 405. In an example, the generation device may determine whether the whole of the tile image corresponding to the visible region 205 is included in by the tile sets 401, 403, and 405.

When it is determined, in operation 410, that the tile image corresponding to the visible region 205 is not included in the tile sets 401, 403, and 405, the generation device, in operation 420, may update the tile image by invoking a stitching result of the tile image corresponding to the visible region 205 from a partial stitching module 320 or loading the tile image corresponding to the visible region 205 from a tile database module 330.

The generation device may store the tile image corresponding to the visible region 205 obtained from the partial stitching module 320 or the tile database module 330 in a target tile set (e.g., the tile set 401) corresponding to the visible region 205. An example of the method of obtaining the stitching result corresponding to the tile image of the visible region 205 from the partial stitching module 320 by the generation device is described in detail below with reference to FIG. 6. In addition, An example of the method of obtaining the tile image of the visible region 205 from the tile database module 330 by the generation device is described in detail below with reference to FIG. 7.

When it is determined, in operation 410, that the tile image 407 of the visible region 205 is included in one of the tile sets 401, 403, and 405 (e.g., the tile set 401), the generation device, in operation 430, may update a tile image corresponding to a peripheral region of the visible region 205 in the tile sets 401, 403, and 405. In an example, the generation device may not update the tile image 407 corresponding to the visible region 205 in the tile set 401.

In addition, the generation device may update the tile image 407 corresponding to the visible region 205 according to whether the visible region 205 is moved. When the visible region 205 is moved, the generation device may update the tile set 401 corresponding to the tile image 407 by redetermining a tile image in a visible region of all layers in the tile sets 401, 403, and 405 and/or in a predetermined range of a peripheral region of the visible region and reflecting the redetermined tile image.

The generation device may determine whether identification information of the tile image 407 changes according to the movement of the visible region 205. The generation device may update a tile image corresponding to a new region that is covered by the moved visible region 205 in the tile sets 401, 403, and 405 corresponding to different zoom levels when it is determined that the identification information of the tile image 407 changes. When updating a tile set, the generation device may use a partial update method. An example of the partial update method is described in detail below with reference to FIG. 5.

Figure 5:
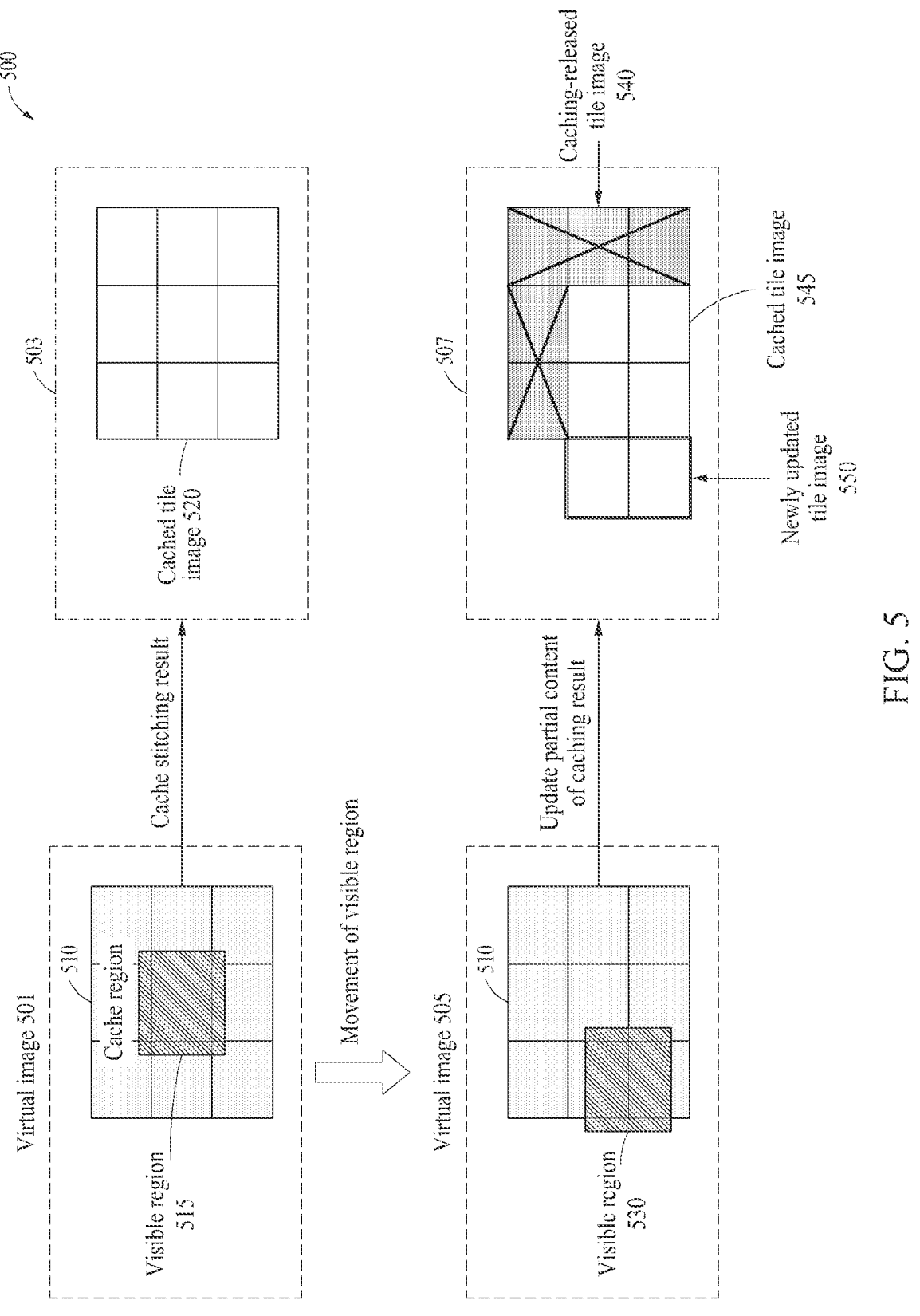
FIG. 5 illustrates an example of a method of partially updating a tile image.

FIG. 5 illustrates an example of a method of partially updating a tile image. Referring to FIG. 5, a diagram 500 illustrates a process of partially updating a tile image changed according to a visible region 515 of a virtual image 501 moving to a visible region 530 of a virtual image 505.

The generation device may determine whether identification information of a tile image stored in a cache region 510 (e.g., a tile image) changes according to the movement of the visible region 515 to the visible region 530. When it is determined that the identification information of the tile image changes according to the movement of the visible region 515 to the visible region 530, the generation device may update a tile image (e.g., a newly updated tile image 550) corresponding to a new region covered by the moved visible region 530 in a plurality of tile sets corresponding to different zoom levels. In an example, the generation device may partially update only a portion changed in the tile sets according to the movement to the visible region 530, that is, the tile image 550 corresponding to the new region covered by the visible region 530, and may not update a tile image (e.g., a cached tile image 545) continuously covered by the cache region 510 after the movement to the visible region 530. The generation device may determine whether a portion of a tile image covered by a preview interface in the moved visible region 530 changes. The generation device may remove a tile image that is not covered by the preview interface from a target tile set corresponding to a zoom level received by a user when it is determined that the portion of the tile image covered by the preview interface changes.

For example, a stitching result of images corresponding to the cache region 510 according to a position of the visible region 515 in the virtual image 501 may be cached as a tile image 520 of a diagram 503. In an example, the visible region 515 of the virtual image 501 may move to the visible region 530 of the virtual image 505. The generation device may partially update the newly updated tile image 550 corresponding to the new region covered by the moved visible region 530 in a tile image 520 cached in the tile sets according to the movement of the visible region 515 to the visible region 530. Despite the movement to the visible region 530, the generation device may maintain the tile image (e.g., the cached tile image 545) continuously covered by the cache region 510 in the tile sets without updating the tile image. The generation device may prevent an increase of cache capacity due to an increase of a cached tile image by releasing the caching of a tile image 540 not covered in the tile sets according to the movement to the visible region 530, e.g., deleting the tile image 540 from cache corresponding to the tile sets.

Figure 6:
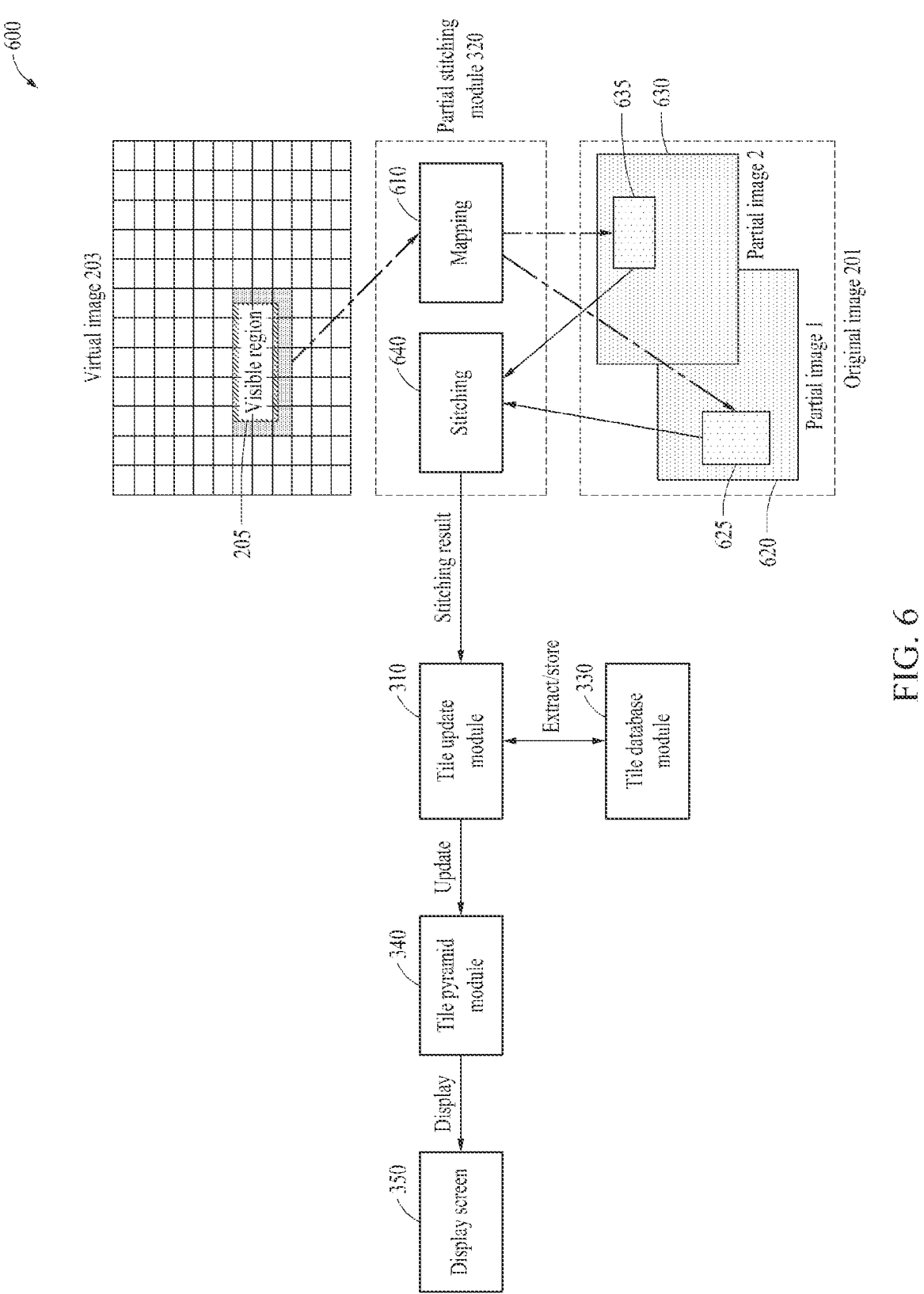
FIG. 6 illustrates an example of a method of obtaining image information of partial images corresponding to a tile image through stitching.

FIG. 6 illustrates an example of a method of obtaining image information of partial images corresponding to a tile image through stitching. Referring to FIG. 6, a diagram 600 illustrates a process of performing partial stitching by using partial images (e.g., a partial image 1 620 and a partial image 2 630) of an original image 201 by a partial stitching module 320 of a generation device.

When a tile image of a visible region 205 is not included in a plurality of tile sets, the generation device may call a stitching result of the tile image corresponding to the visible region 205 from the partial stitching module 320.

The generation device may determine target identification information of a tile image included in a target tile set covered by the visible region 205 of the tile sets. In an example, identification information of tile images included in the target tile set may be provided, for example, through an tile update module 310.

The generation device may determine the partial images 1 and 2 620 and 630 used for stitching in the original image 201 by performing mapping 610 on the original image 201, based on the target identification information. In an example, the mapping 610 may be reverse mapping. The generation device may partially update tile images 625 and 635 corresponding to the visible region 205 through partial stitching 640 as a portion of the tile image corresponding to the visible region 205 by loading the partial images 1 and 2 620 and 630 from the original image 201.

In an example, the stitching result (e.g., a stitched tile image) of the partial stitching module 320 may be provided to the tile update module 310.

Figure 7:
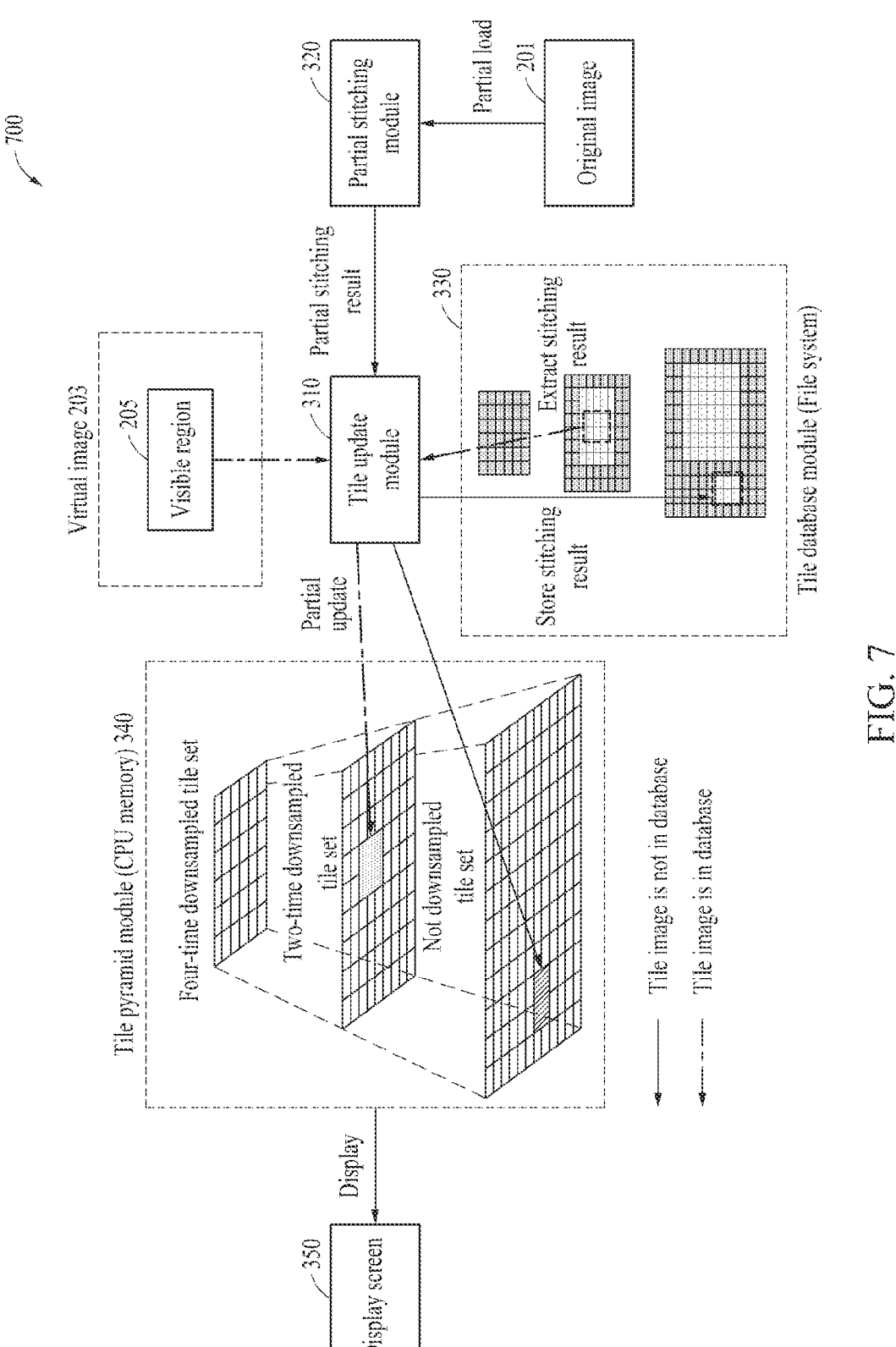
FIG. 7 illustrates an example of a method of storing a tile image.

FIG. 7 illustrates an example of a method of storing a tile image. Referring to FIG. 7, a diagram 700 illustrates a method of storing a tile image corresponding to a stitching result in a database by a tile database module 330 of a generation device.

The tile database module 330 may store, in a file system (e.g., a database), a tile image corresponding to a stitching result of a partial stitching module 320 received from a tile update module 310.

A plurality of tile sets may be in a system memory (e.g., a memory of a central processing unit (CPU)), but the size of a system memory of a mobile platform may be limited. Accordingly, the generation device of one or more embodiments may store tile information by using the tile database module 330 based on the file system.

For example, when a tile image to be updated by the tile update module 310 is neither in a tile pyramid module 340 nor in the tile database module 330, the tile update module 310 may call the partial stitching module 320 and load partial images corresponding to the tile image to be updated from an original image. The partial stitching module 320 may store a tile image obtained by stitching the loaded partial images in the tile pyramid module 340 and the tile database module 330.

When the tile image to be updated by the tile update module 310 is not in the tile pyramid module 340 but is in the tile database module 330, the generation device may save a computing time by directly copying data (e.g., information of the tile image to be updated) stored in the database of the tile database module 330 to the tile pyramid module 340. The tile pyramid module 340 may be, or be stored in, a CPU memory, for example.

The generation device of one or more embodiments may dynamically and rapidly generate a high-resolution stitching result of a visible region 205 of a user through a tile-based caching system. Accordingly, the user may be rapidly provided the stitching result of the visible region 205 without waiting until an entire virtual stitching image, that is, the whole of an entire virtual image 203 is completely generated. In other words, the generation device of one or more embodiments may provide an interactive browsing experience of near real-time by displaying a partially stitched image corresponding to the visible region 205, not the entire virtual image 203, through a preview interface, and a generated preview image may have no loss in details compared to a final stitched image.

Figure 8:
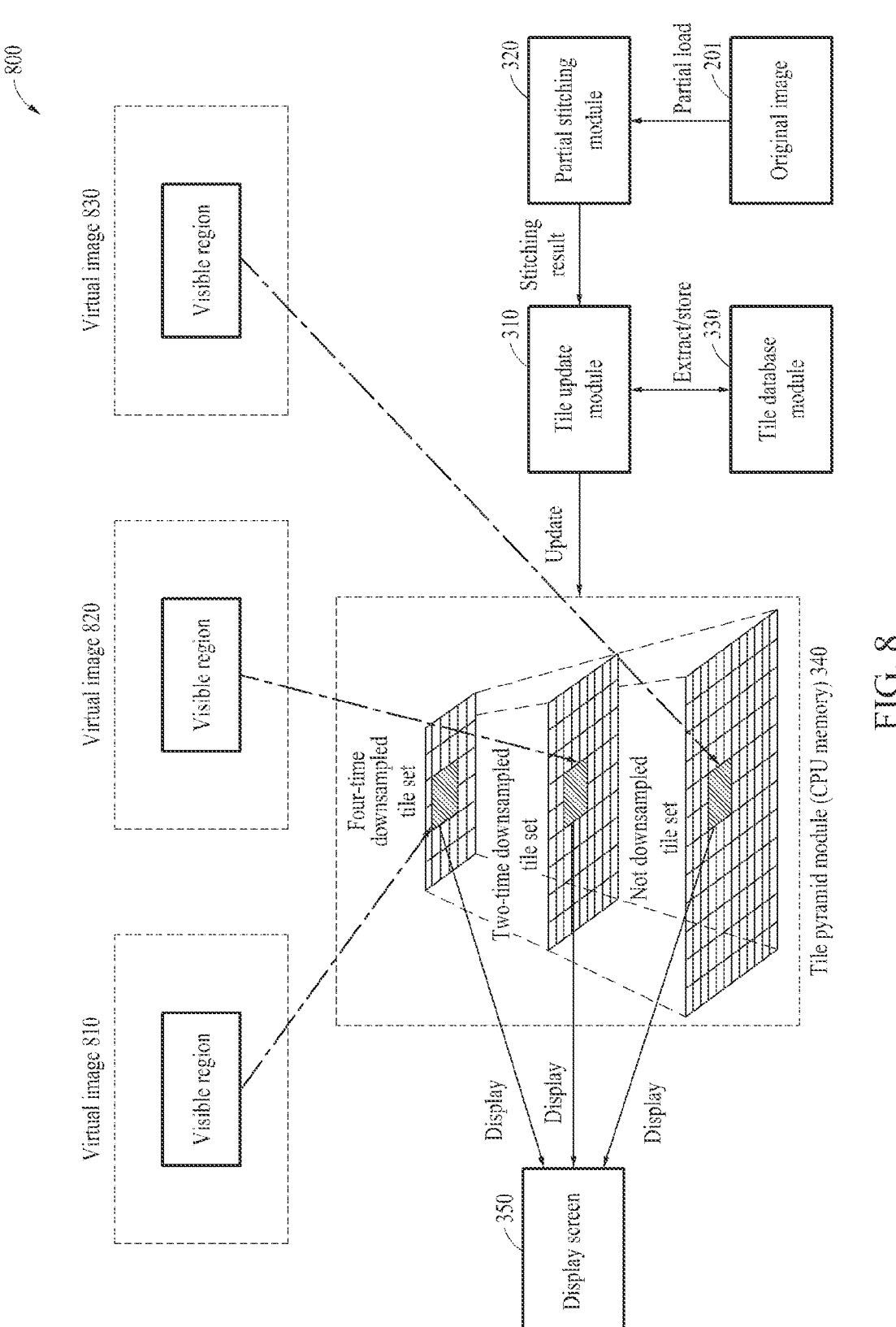
FIG. 8 illustrates an example of a method of displaying a preview image.

FIG. 8 illustrates an example of a method of displaying a preview image. Referring to FIG. 8, a diagram 800 illustrates a method of displaying a preview image through a pyramid structure of three layers by a tile pyramid module 340 of a generation device.

The tile pyramid module 340 may store, by layers, data of tile images downsampled to various zoom levels by using a plurality of tile sets in the pyramid structure. In an example, the respective layers included by the pyramid structure may correspond to the respective tile sets, that is, respective pieces of the data of the tile images corresponding to the respective zoom levels. The data of the tile images may correspond to identification information of tile images corresponding to respective visible regions of virtual images 810, 820, and 830 having different resolutions.

The generation device may provide the preview image by using a tile set including a tile image having a resolution suitable for the size of a display screen 350 among the tile sets included by the pyramid structure of the tile pyramid module 340.

The size of a screen in the generation device may be fixed, and accordingly, the generation device may sample an image to be displayed to various sizes depending on the size of a visible region. For example, when the size of the visible region is great in a virtual image, the generation device may downsample a significant portion of the image to be displayed. In an example, the tile pyramid module 340 may include the tile sets, such as a tile set that is not downsampled, a tile set that is downsampled two times, and a tile set that is downsampled four times. In an example, the downsampling may be referred to as 'subsampling' or 'downscaling'. As the tile pyramid module 340 includes the tile sets that are downsampled to different resolutions, the generation device may generate the preview image suitable for the region size of the display screen 350. In addition, the generation device may generate a thumbnail image of different sizes that is reduced from an original image 201 by using the tile sets downsampled to different resolutions.

Figure 9:
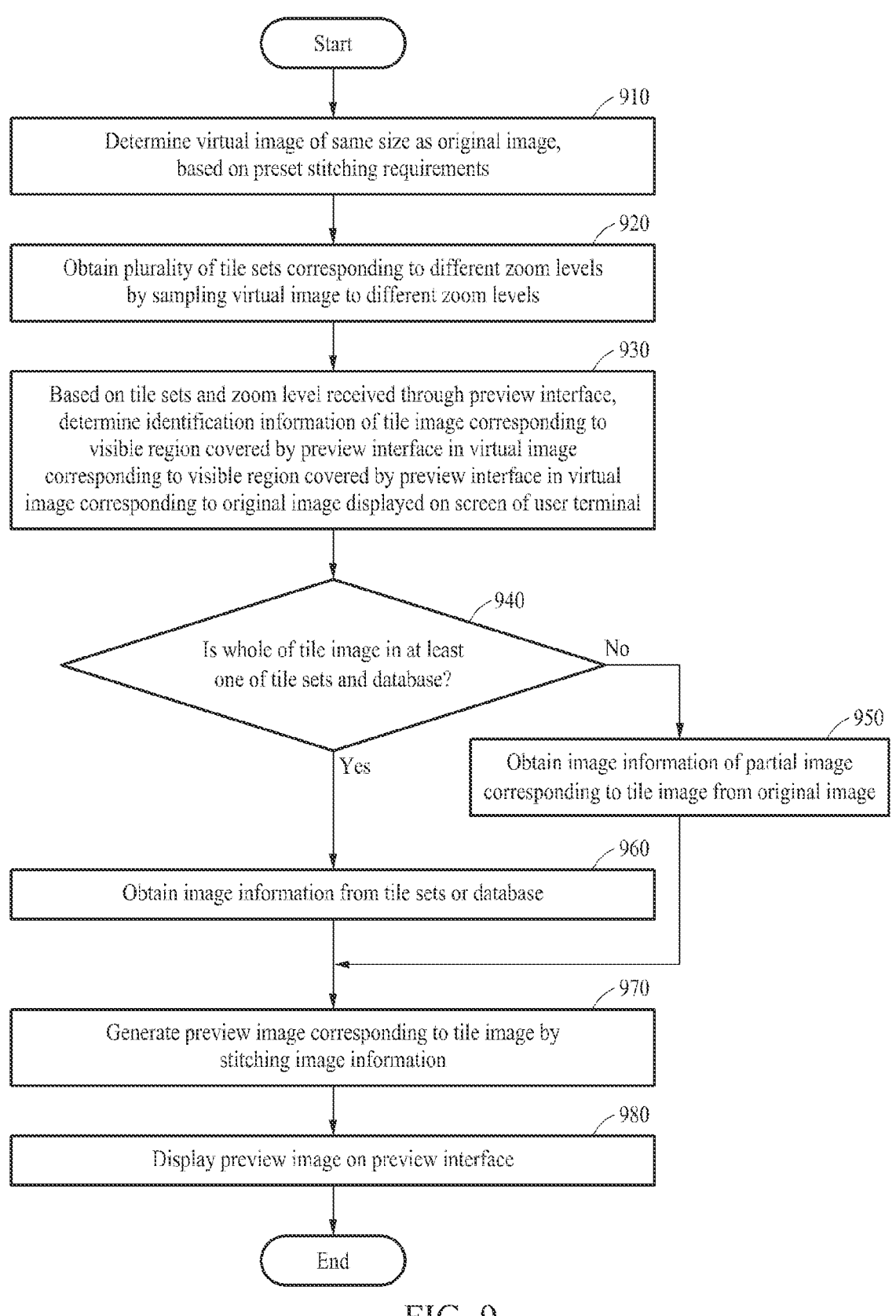
FIG. 9 illustrates an example of a method of generating a preview image.

FIG. 9 illustrates an example of a method of generating a preview image. Operations to be described hereinafter may be performed sequentially but not necessarily performed sequentially. For example, the order of the operations may change and at least two of the operations may be performed in parallel.

Referring to FIG. 9, a generation device (e.g., the generation device 1000 of FIG. 10) may generate and display the preview image through operations 910 to 980.

In operation 910, the generation device may determine a virtual image of the same size as an original image, based on preset stitching settings. For example, the generation device may preset the preset stitching settings, such as which original image is used in a stitching process, how the original image is arranged, or the like. The generation device may obtain a virtual image of the same size as an image stitched according to the preset stitching settings.

In operation 920, the generation device may obtain a plurality of tile sets corresponding to different zoom levels by sampling the virtual image determined in operation 910 to the different zoom levels. The generation device may rapidly provide a subsequent preview in a real time by rapidly obtaining the tile sets corresponding to the virtual image.

In operation 930, the generation device, based on the tile sets obtained in operation 920 and a zoom level received through a preview interface, may determine identification information of a tile image corresponding to a visible region covered by the preview interface in the virtual image corresponding to the original image displayed on a screen of a user terminal.

In operation 940, the generation device may determine whether the whole of a tile image is in at least one of the tile sets and a database.

When it is determined, in operation 940, that the whole of the tile image is not in at least one of the tile sets and the database, the generation device, in operation 950, may obtain image information of a partial image corresponding to the tile image from the original image.

When it is determined, in operation 940, that the whole of the tile image is in at least one of the tile sets and the database, the generation device, in operation 960, may obtain image information of the tile image from the tile sets or the database.

In operation 970, the generation device may generate a preview image corresponding to the tile image by stitching the image information of the partial image obtained in operation 950 or the image information of the tile image obtained in operation 960.

In operation 980, the generation device may display the preview image generated in operation 970 on the preview interface. After displaying the preview image, the generation device may cache the tile image in a target tile set corresponding to the zoom level received through the preview interface among the tile sets. Alternatively, the generation device may store, in the database, the target tile set in which the tile image is cached.

FIG. 10 illustrates an example of a device for generating a preview image. Referring to FIG. 10, a device for generating the preview image ('generation device') 1000 may include a processor 1010 (e.g., one or more processors), a display device 1030, a memory 1050 (e.g., one or more memories), and a communication interface 1070. The processor 1010, the display device 1030, the memory 1050, and the communication interface 1070 may connect to one another through a communication bus 1005.

The processor 1010 may determine identification information of a tile image corresponding to a visible region covered by a preview interface in a virtual image corresponding to an original image displayed on a screen of a user terminal. The processor 1010 may obtain image information of the tile image based on the identification information of the tile image. The processor 1010 may generate a preview image corresponding to the tile image by stitching the image information of the tile image. The processor 1010 may include and perform any one, combination, or all of the operations of the tile update module 310, the partial stitching module 320, the tile database module 330, and the tile pyramid module 340 described above. The processor may be or include a CPU including a system memory, as described above.

In addition, the processor 1010 may execute a program and control the generation device 1000. The code of the program executed by the processor 1010 may be stored in the memory 1050.

The display device 1030 may display the preview image generated by the processor 1010 through the preview interface. The display device 1030 may include and perform any one, combination, or all of the operations of the display screen 250 and the display screen 350 described above.

The memory 1050 may store one or more instructions. In addition, the memory 1050 may store a neural network used for training. The memory 1050 may store various pieces of information generated in a processing operation of the processor 1010 and/or at least one program. Although the memory 1050 may store, for example, a changed early termination time by the processor 1010, examples are not limited thereto.

In addition, the memory 1050 may store various pieces of data, programs, and the like. The memory 1050 may include a volatile memory or a non-volatile memory. The memory 1050 may include a massive storage medium, such as a hard disk, and store the various pieces of data.

The communication interface 1070 may receive the original image and/or output the preview image to the outside of the generation device 1000.

In addition, the processor 1010 may perform a technique corresponding to at least one method described above with reference to FIGS. 1 to 9. The processor 1010 may be, for example, a mobile application processor (AP), but examples are not limited thereto. In addition, the processor 1010 may be a hardware-implemented generation device having a circuit that is physically structured to execute desired operations. For example, the desired operations may include code or instructions in a program. The hardware-implemented generation device may include, for example, a microprocessor, a super-sampling CPU, a super-sampling graphics processing unit (GPU), a processor core, a multi-core processor, a multiprocessor, an application-specific integrated circuit (ASIC), a field-programmable gate array (FPGA), and a neural processing unit (NPU).

The display screens, generation devices, tile update modules, partial stitching modules, tile database modules, tile pyramid modules, processors, display devices, memories, communication interfaces, display screen 250, generation device 300, tile update module 310, partial stitching module 320, tile database module 330, display screen 350, tile pyramid module 340, generation device 1000, processor 1010, display device 1030, memory 1050, and communication interface 1070 described herein and disclosed herein described with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure

What is claimed is:

1. A processor-implemented method comprising:
determining identification information of a tile image corresponding to a visible region covered by a preview interface in a virtual image corresponding to an original image displayed on a screen of a user terminal, based on a zoom level received through the preview interface and a plurality of tile sets determined by downsampling the virtual image to different zoom levels;
determining image information of the tile image based on the identification information of the tile image; and
generating a preview image corresponding to the tile image by stitching the image information of the tile image.

2. The method of claim 1, wherein
the tile sets comprise identification information of tile images comprised in virtual images comprising different zoom levels through a pyramid structure, and
layers of the pyramid structure respectively correspond to the tile sets comprising the different zoom levels.

3. The method of claim 1, wherein the identification information of the tile image comprises any one or any combination of any two or more of a position of the tile image in the virtual image, a size of the tile image, and a flag indicating whether a plurality of tile sets comprises the tile image.

4. The method of claim 1, further comprising determining the virtual image as the same size as the size of the original image, based on a preset stitching setting.

5. The method of claim 1, further comprising determining a plurality of tile sets corresponding to different zoom levels by sampling the virtual image to the different zoom levels.

6. The method of claim 1, further comprising displaying the preview image on the preview interface.

7. The method of claim 1, further comprising either one or both of:
caching the tile image in a target tile set corresponding to a zoom level received through the preview interface among the tile sets; and
storing the target tile set in which the tile image is cached in a database.

8. The method of claim 1, further comprising:
determining whether the identification information of the tile image changes according to movement of the visible region; and
deleting a tile image corresponding to the changed identification information from a target tile set corresponding to the visible region in response to a change of the identification information of the tile image.

9. A non-transitory computer-readable storage medium storing instructions that, when executed by one or more processors, cause the one or more processors to perform the method of claim 1.

10. The method of claim 1, wherein the determining the image information of the tile image comprises:

determining whether a plurality of tile sets comprises the tile image, based on the identification information of the tile image;

determining the image information of the tile image from the tile sets in response to determining that the tile sets comprise the tile image; and updating the tile image in response to determining that the tile sets do not comprise the tile image.

11. The method device of claim 10, wherein the updating the tile image comprises:

updating the tile image corresponding to the visible region in response to determining that the tile sets do not comprise an entirety of the tile image; and updating a tile image corresponding to a peripheral region of the visible region in response to determining that the tile sets comprise the entirety of the tile image.

12. The method of claim 11, wherein the updating the tile image corresponding to the visible region comprises:

determining target identification information of the tile image comprised in a target tile set covered by the visible region of the tile sets;

determining partial images for stitching in the original image by performing reverse mapping on the original image, based on the target identification information; and partially updating the tile image corresponding to the visible region by partially stitching the partial images to a portion of the tile image.

13. The method of claim 11, wherein the updating the tile image corresponding to the visible region comprises:

determining whether a database comprises the tile image that is not comprised in the tile sets;

extracting the tile image that is not comprised in the tile sets from the database in response to determining that the database comprises the tile image that is not comprised in the tile sets; and storing the extracted tile image in a target tile set corresponding to the visible region.

14. The method of claim 11, wherein the updating the tile image corresponding to the visible region comprises:

determining whether the identification information of the tile image changes according to movement of the visible region; and updating a tile image corresponding to a new region covered by the moved visible region in the tile sets corresponding to different zoom levels in response to determining that the identification information of the tile image changes.

15. The method of claim 14, wherein the updating the tile image corresponding to the new region comprises:

determining whether a portion of a tile image covered by the preview interface in the moved visible region changes; and removing a tile image that is not covered by the preview interface from a target tile set corresponding to a zoom level received by a user in response to determining that the portion of the tile image covered by the preview interface changes.

16. A processor-implemented method comprising:

determining identification information of a tile image corresponding to a visible region covered by a preview interface in a virtual image corresponding to an original image displayed on a screen of a user terminal;

determining image information of the tile image based on the identification information of the tile image; and generating a preview image corresponding to the tile image by stitching the image information of the tile image, wherein the determining the identification information of the tile image comprises determining the identification information of the tile image, based on a zoom level received through the preview interface and a plurality of tile sets determined by downsampling the virtual image to different zoom levels, and wherein the received zoom level is determined by a user gesture that is recognized through the preview interface on the screen of the user terminal.

17. The method of claim 16, wherein the user gesture comprises any one or any combination of any two or more of zoom-in and zoom-out operations performed using two fingers of a user, zoom-in and zoom-out operations performed through a double click of the user, and a dragging operation performed by the user.

18. An apparatus comprising:

one or more processors;

a memory comprising one or more non-transitory storage media that store instructions that, when executed by the one or more processors, configures the electronic device to:

determine identification information of a tile image corresponding to a visible region covered by a preview interface in a virtual image corresponding to an original image displayed on a screen of a user terminal, based on a zoom level received through the preview interface and a plurality of tile sets determined by downsampling the virtual image to different zoom levels;

determine image information of the tile image based on the identification information of the tile image; and generate a preview image corresponding to the tile image by stitching the image information of the tile image.

19. The apparatus of claim 18, further comprising a display device configured to display the preview image through the preview interface.

* * * * *